United States Patent [19]
Bernhardt

[11] Patent Number: 5,143,607
[45] Date of Patent: Sep. 1, 1992

[54] ARRANGEMENT FOR DRIVING OUT VOLATILE IMPURITIES FROM GROUND WATER

[75] Inventor: Bruno Bernhardt, Reutlingen, Fed. Rep. of Germany

[73] Assignee: IEG Industrie-Engineering GmbH, Reutlingen, Fed. Rep. of Germany

[21] Appl. No.: 807,173

[22] Filed: Dec. 13, 1991

[30] Foreign Application Priority Data

Dec. 13, 1990 [DE] Fed. Rep. of Germany ....... 4039824

[51] Int. Cl.⁵ .................. B01D 19/00; C02F 1/20
[52] U.S. Cl. .................. 210/170; 210/188; 210/218; 210/901; 166/74; 166/242; 166/278; 166/311; 55/189; 55/196; 261/77
[58] Field of Search .......... 210/170, 188, 218, 220, 210/747, 901; 55/183, 196; 166/74, 242, 278, 311; 261/77, 122

[56] References Cited

U.S. PATENT DOCUMENTS

| | | | |
|---|---|---|---|
| 4,478,765 | 10/1984 | Subbs | 210/170 |
| 4,543,186 | 9/1985 | Weisenburger er al. | 210/170 |
| 4,582,610 | 4/1986 | Baker | 210/170 |
| 4,765,902 | 8/1988 | Ely et al. | 210/901 |
| 4,883,589 | 11/1989 | Konon | 210/170 |
| 4,950,394 | 8/1990 | Bernhardt et al. | 210/170 |

FOREIGN PATENT DOCUMENTS

3625488 10/1987 Fed. Rep. of Germany.

*Primary Examiner*—Stanley S. Silverman
*Assistant Examiner*—Christopher Upton
*Attorney, Agent, or Firm*—Michael J. Striker

[57] ABSTRACT

An arrangement for driving out volatile impurities from ground water by air or another gas, has a shaft adapted to extend to a ground water region and having at least locally a water-permeable wall formed as another wall and limiting at least partially an air receiving chamber communicating with an outside air, a ventilator communicating with the shaft for producing a negative pressure and aspirating air from a shaft portion located above a ground water level, a pipe extending in the shaft to an area under the ground water level so as to form the air receiving chamber and to provide communication to the outside air, the pipe having an inner end region provided with nozzle openings, a screening sleeve arranged concentrically relative to the pipe and at least partially covering the end region of said pipe provided with said nozzle openings. The screening sleeve is supported displaceably relative to the pipe and sealed relative to the pipe and a floating body coupled with the pipe.

7 Claims, 2 Drawing Sheets

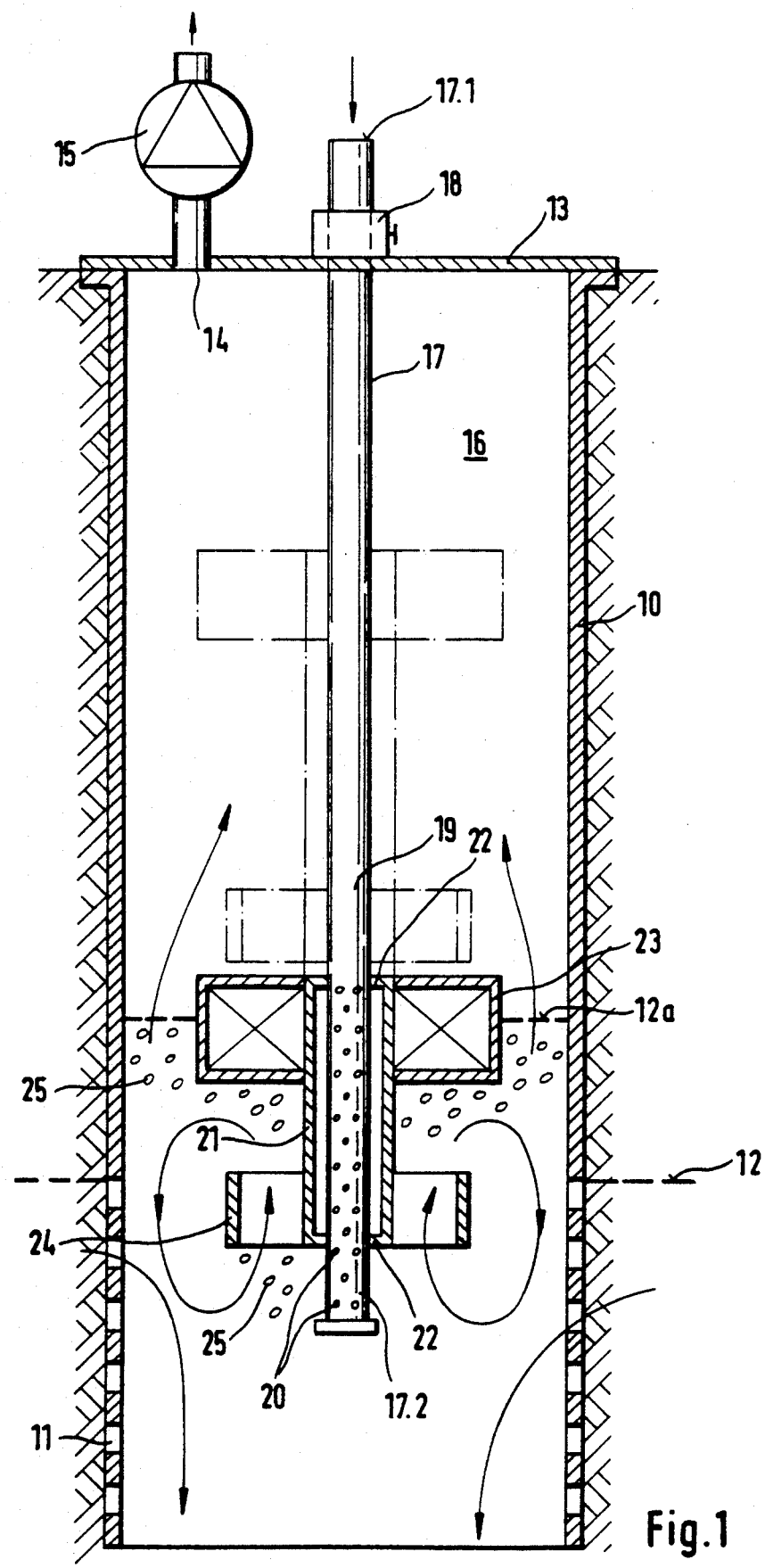

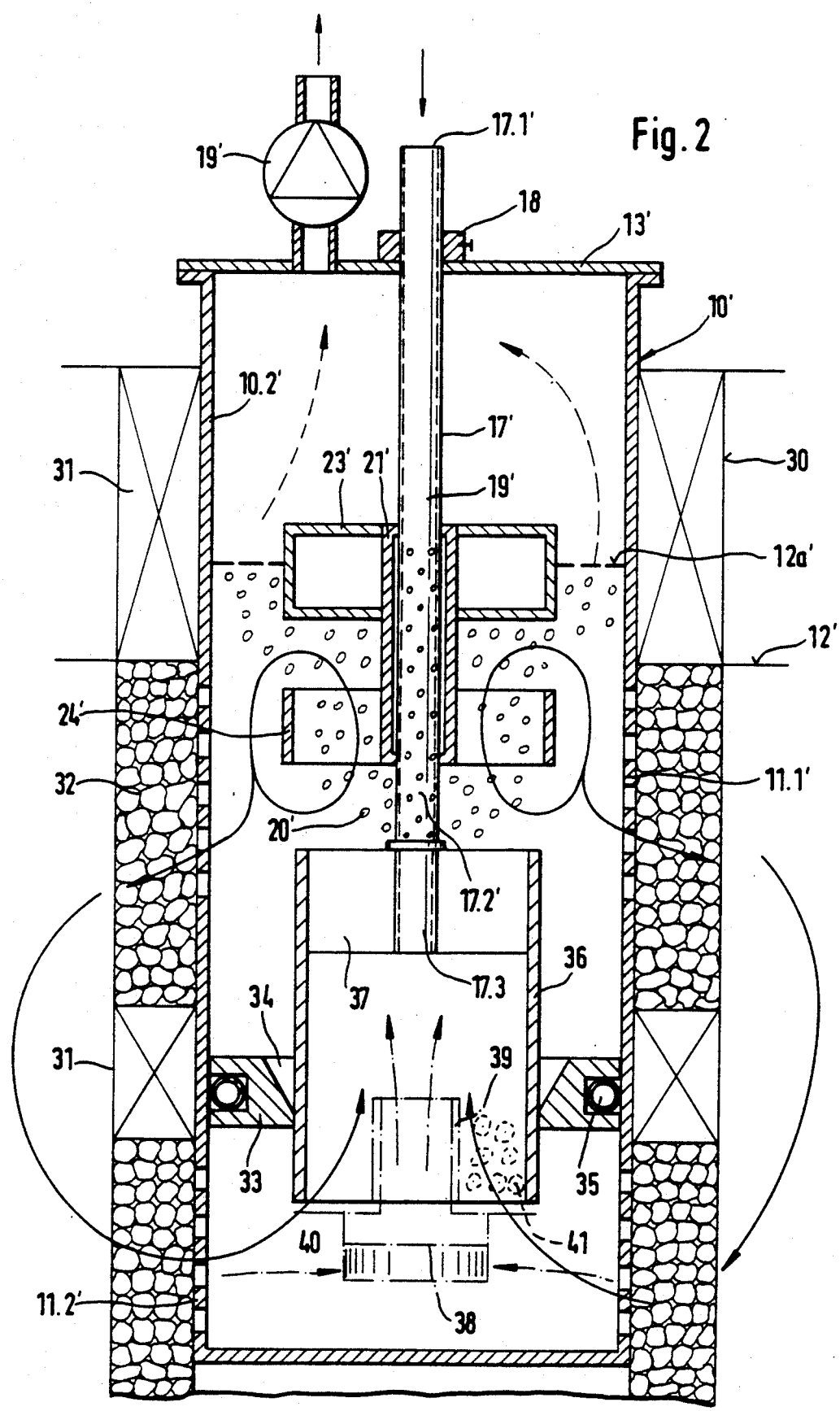

ARRANGEMENT FOR DRIVING OUT VOLATILE IMPURITIES FROM GROUND WATER

BACKGROUND OF THE INVENTION

The present invention relates to an arrangement for driving out volatile impurities from ground water by air or another gas.

Arrangements of the above mentioned general type are known in the art. One such arrangement is disclosed for example in the German document DE-OS 3,625,488. The arrangement disclosed in this document has the advantage that, with low energy consumption due to negative pressure build up above the ground water level in a shaft, air or other gas can be aspirated than in an air receiving chamber located underneath the ground water level in the shaft, and from there can discharge through a sieve wall into the liquid and pass through the liquid in form of bubbles and thereby the volatile impurities can be removed from the ground water. It has been also proposed to form the sieve wall and nozzle plate which extends through a greater part of the shaft cross-section and carries a float. Thereby it remains always in the same and adjustable distance from the ground water level in the shaft.

It has been shown that in narrow shaft boreholes or well shafts, the arrangement of the nozzle plate extending transverse to the longitudinal axis of the shaft poses some difficulties and prevent ground water circulation produced by the throughgoing air or another gas and identified as "air lift effect".

SUMMARY OF THE INVENTION

Accordingly, it is an object of the present invention to provide an arrangement for driving out volatile impurities from ground water, which avoids the disadvantages of the prior art.

More particularly, it is an object of the present invention to provide an arrangement for driving out volatile impurities from the ground water which is formed so that even in narrow well boreholes or in other words in the boreholes having small shaft cross-section, a high efficiency is guaranteed.

In keeping with these objects and with others which will become apparent hereinafter, one feature of the present invention resides, briefly stated, in an arrangement for driving out volatile impurities from a ground water in which an air receiving chamber and its connection to an outside air is formed by a pipe which extends in the shaft to the level under the ground water level. The pipe is provided in its inner end region with nozzle openings, and the nozzle openings region of the pipe is partially covered by a concentric sleeve which is supported displaceably on the pipe and at least at its upper end is sealed relative to the pipe, wherein the sleeve is coupled with a floating body.

When the arrangement is designed in accordance with the present invention instead of a nozzle plate extending transversely to the longitudinal axis of the shaft, it has the above mentioned pipe provided with a nozzle opening region and designed so that it forms an air receiving chamber and is arranged concentrically relative to the shaft to the level below the ground water level. The end region provided with the nozzle openings under the ground water level is partially covered by the above mentioned concentric sleeve, which due to its coupling with the floating body maintains the nozzle opening at a predetermined distance underneath the ground water level in the shaft. The space around the pipe and the sleeve is sufficient to provide a desired circulation movement of the ground water under the action of the through-going air for automatically transporting the contaminated ground water from the deeper shaft regions upwardly into the cleaning region. The circulatory movement is further improved by a water guiding ring arranged at a distance from the sleeve concentrically to it.

The pipe which is arranged in the central region serves simultaneously for post-aspiration of outer air. Advantageously it is arranged so that it is longitudinally displaceable in a shaft cover.

The pipe which forms the air receiving chamber at its lower end can be connected at its end with a water supply pipe having a greater diameter. The water supply pipe extends deeper into the shaft and passes tightly through an opening of a transverse wall which separates the ground-water filled shaft chamber. This construction is favorable not only for the circulation of water in the shaft provided by the air lift effect, but also for a ground water movement in the ground region which surrounds the shaft. For this purpose the shaft wall is maintained water-impermeable in the region of the transverse wall. Therefore, the ground water which is driven into movement by the air above the transverse wall is forced after passing the cleaning zone to discharge through an upper water-permeable shaft wall region into the surrounding ground region and to set in movement the ground water which is located in it to flow through the water-permeable shaft wall underneath the transverse wall and then through the water guiding pipe through a transverse wall upwardly into the cleaning region.

The desired ground water circulation with the shaft pipe of a narrow cross-section is further improved when during aspiration of cooler outside air and the thusly produced cooling of the ground water a greater density of the purified ground water is obtained in the cleaning region of the shaft through which air or gas passes. It includes sinking of the purified ground water in the shaft and also in the surrounding ground region after exiting the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing schematical longitudinal section of an upper end of a well shaft provided with the arrangement for driving out volatile impurities from ground water in accordance with the present invention; and FIG. 2 is a longitudinal section substantially corresponding to the longitudinal section of FIG. 1 but showing a second embodiment of an arrangement in accordance with the present invention.

DESCRIPTION OF THE PREFERRED EMBODIMENTS

FIG. 1 shows a well pipe 10 which covers a well borehole. The well pipe 10 has a region which extends to a ground region leading to a ground water and is provided with a water-permeable wall 11. A ground water level is identified with reference numeral 12 and illustrated with a line. The well pipe 10 is closed from above by a cover 13.

The cover 13 has a first cover opening 14. A ventilator 15 is arranged above the first cover opening 14 and produces a negative pressure in an inner chamber 16 of the valve pipe 10. The cover 13 also has a central through-going opening for a pipe 17 which is retained by the cover 13 by a clamping seal 18. The pipe 17 forms an air receiving chamber 19 which communicates with an outer air through an upper opening 17.1 of the pipe 17. The pipe 17 has an inner end region 17.2 provided with nozzle openings 20. A concentric screening sleeve 21 extends over a greater longitudinal portion of the end region 17.2 provided with the nozzle openings 20. The screening sleeve 21 is longitudinally displaceable on the pipe 17. It is sealed at its both ends relative to the pipe by sealing rings 22. A ring-shaped floating body 22 is connected with the screening sleeve 21 at its upper end. A concentric water guiding ring 24 is mounted on the lower end of the screening sleeve 21 at a distance from it.

Due to the negative pressure which is produced by the ventilator 15 in the inner chamber 16 of the well pipe 10, the ground water level in the interior of the well pipe 10 is lifted relative to the outer ground water level 12 to a level 12a. Furthermore, the air which is located under atmospheric pressure in the air receiving chamber 19 formed by the pipe 17 is sucked outwardly through the nozzle openings 20 which are not covered by the screening sleeve 21 and into the ground water which is located in the well pipe. Thereby this air raises in the form of air bubbles 25 through the ground water upwardly into the inner chamber 16 of the well pipe 10. The air removes volatile impurities from the ground water, such as for example carbon substance, and they are withdrawn by the ventilator 15 together with the air outwardly of the well shaft 10. The air is passed in a not shown manner through a filter for filtering out of the impurities.

The air which raises in form of the air bubbles 25 through the ground water bring the ground water into an active flow movement. The ground water raises in the central region upwardly and then sinks downwardly along the water-permeable pipe wall 11. The ground water circulation is improved the water guiding ring 24. When the outer air is colder than the ground water in the shaft, a cooling of the ground water in the above described cleaning region is performed, and thereby a compression of the ground water which flows on the wall downwardly occurs. Thereby the ground water circulation in the well pipe is further improved.

The height of the cleaning region through which the air bubbles 20 flow is always fixed by the length of the screening sleeve 21 and is not dependent on the momentary ground level 12 or 12a, since the screening sleeve 21 can follow the ground water level fluctuations due to the float 23.

FIG. 2 shows an arrangement provided with additional parts. The parts of the arrangement in FIG. 2 which correspond to the parts of the arrangement in FIG. 1 are identified with the same reference numerals with added indexes. The pipe shaft 10' is arranged at a distance in a shaft borehole 30 and provided in the region of the ground water with an upper water-permeable pipe portion 11.1' and a lower water-permeable pipe portion 11.2'. These portions are separated from one another by a water-impermeable wall portion 10.1'. The end portion 10.2' of the well pipe 10' which extends in the ground water-free ground region is also water-impermeable. The intermediate space formed between the well pipe 10' and the wall of the shaft borehole 30 is closed by a sealing material 31 at the height of the water-impermeable pipe portions 10.1' and 10.2'. In the region of the water-permeable pipe portions 11.1' and 11.2' it is filled with particulate bodies 32 which do not hinder the water passage.

The inner space of the pipe 10' is subdivided in the region of the water-impermeable pipe portion 10.1' by an intermediate wall 33 which is tightly inserted in the pipe. The intermediate wall has a large central through-going opening 34 formed so that at its edge the intermediate wall 33 reduces to form a sealing lip 35. A water guiding pipe 36 extends through the throughgoing opening 34 and is connected with a lower end 17.3' of the central pipe 17' by radial webs 37. When the additional parts are used in this arrangement the purified ground water discharges from the cleaning region continuously through the water-permeable pipe portion 11.1' outwardly to the ground water-containing ground region. Then the ground water flows through the water guiding pipe 36 from the deeper shaft borehole region upwardly to the cleaning region. The flow of water is identified with solid arrow lines, while the flow of air is identified by broken arrow lines.

The water flow in the well shaft 10' can be strengthened when needed by a pump 38, as identified in FIG. 2 with dash-dot lines before the lower opening of the water guiding pipe 36. Moreover, a concentric guiding pipe 39 is arranged before the pump 38 as shown in dash-dot lines in FIG. 2. It permits inside the water guiding pipes 36 an upwardly open annular chamber 40. Solid bodies 41 which release auxiliary means or dissolve in water are accommodated in the ring chamber 40 for supporting the cleaning action.

It will be understood that each of the elements described above, or two or more together, may also find a useful application in other types of constructions differing from the types described above.

While the invention has been illustrated and described as embodied in an arrangement for driving out volatile components from ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for driving out volatile impurities from ground water by air or another gas, comprising a shaft extending to a ground water region, having at least locally in said ground water region a water-permeable wall; a ventilator communicating with said shaft for producing a negative pressure and aspirating air from a shaft portion located above a ground water surface level; a pipe extending in said shaft to an area under said ground water level so as to form an air receiving chamber, said pipe being in communication with the outside air, and having a lower end region provided with nozzle openings at least partially under said ground water level; a screening sleeve arranged concentrically relative to said pipe and at least partially covering said end region of said pipe provided with said nozzle openings, said screening sleeve being supported displaceably relative to said pipe by means for sealing said sleeve relative to said pipe; and a floating body means coupled with said sleeve floating on the surface of the groundwater.

2. An arrangement for driving out volatile impurities as defined in claim 1, wherein said screening sleeve has a lower end; and further comprising a concentric water guiding ring mounted on said lower end of said screening sleeve at a distance from said screening sleeve.

3. An arrangement for driving out volatile impurities as defined in claim 1; further comprising a cover which closes said shaft, said pipe which forms said air receiving chamber being supported longitudinally displaceably on said cover.

4. An arrangement for driving out volatile impurities as defined in claim 1, wherein said pipe which forms said air receiving chamber has a lower end; and further comprising a water guiding pipe which is mounted on said lower end of said pipe, extends downward coaxially relative to said pipe, and has a greater diameter than said pipe.

5. An arrangement for driving out volatile impurities as defined in claim 4; further comprising a transverse wall which subdivides a ground water-filled space in said shaft and is provided with an opening, said water guiding pipe extending through said opening of said transverse wall, and wherein said wall of said shaft in the region of said transverse wall has a water-impermeable portion.

6. An arrangement for driving out volatile impurities as defined in claim 4, wherein said water guiding pipe has a lower opening; and further comprising a pump communicating with said lower opening of said water guiding pipe.

7. An arrangement for driving out volatile impurities as defined in claim 6; further comprising a concentric additional guiding pipe arranged inside said water guiding pipe above said pump, said additional guiding pipe forming an upwardly open ring-shaped chamber in said water guiding pipe.

* * * * *